UNITED STATES PATENT OFFICE.

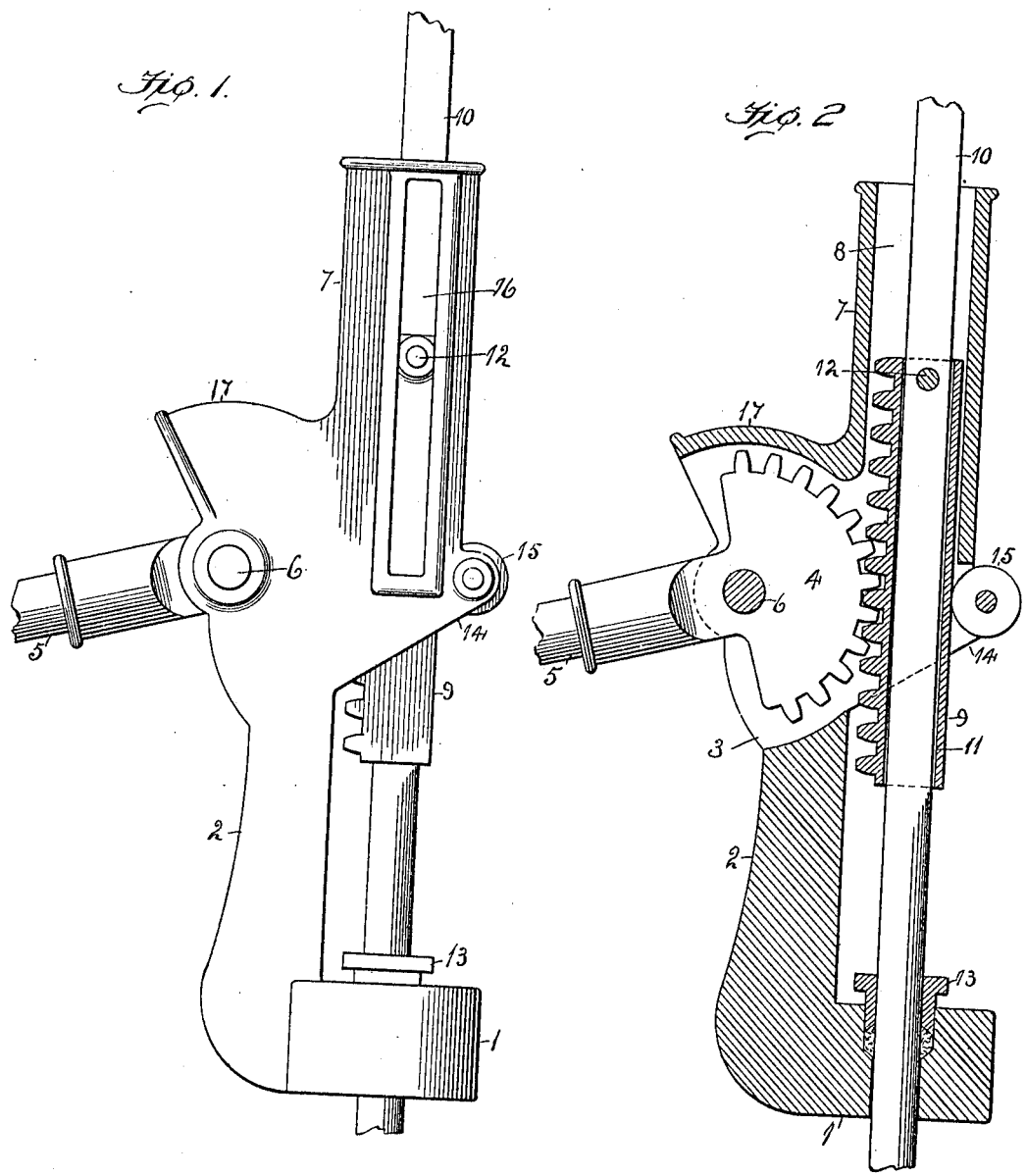

OSCAR W. JOHNSON, OF ROCKFORD, ILLINOIS, ASSIGNOR TO WARD PUMP COMPANY, OF ROCKFORD, ILLINOIS, A CORPORATION OF ILLINOIS.

PUMP.

949,277.  Specification of Letters Patent.  Patented Feb. 15, 1910.

Application filed May 14, 1909. Serial No. 496,074.

*To all whom it may concern:*

Be it known that I, OSCAR W. JOHNSON, a citizen of the United States, residing at Rockford, in the county of Winnebago and State of Illinois, have invented certain new and useful Improvements in Pumps, of which the following is a specification.

The object of this invention is to construct a pump capable of being operated by hand or power.

In the accompanying drawings, Figure 1 is a side elevation. Fig. 2 is a vertical section through the casing or support for the operative parts.

From the cap 1 of the pump standard extends a standard 2 having its upper portion formed with a vertical opening 3 within which is located a toothed quadrant 4, and which is held in a pivotal manner by the pivot 6. A handle 5 has a connection with the toothed quadrant and by which the quadrant is oscillated. The upper portion 7 of the standard 2 adjacent to the toothed quadrant 4 is formed with a vertical passageway 8. A toothed rack 9 is located in the passageway 8 and meshes with the toothed quadrant 4. A pump rod 10 passes through an opening 11 in the toothed rack 9, and a pin 12 passing through the toothed rack and pump rod serves to connect them. The pump rod 10 passes through a guide way 13 in the pump cap 1. From the lower end of the upper portion 7 of the stud extend two ears 14 between which is pivoted a roller 15.

The side plates of the upper portion 7 of the standard 2 are each formed with an opening 16 extending in the lengthwise direction thereof. These side openings permit the vertical movement of the pin 12 in its connection with the toothed rack and pump rod when the pump rod is reciprocated by the operation of the handle. The upper portion 7 extends above the upper end of the toothed rack, when the toothed rack is in its uppermost position in order that the toothed rack may have a bearing as to lateral movement. The roller 15 serves to receive the side pressure of the toothed rack caused by the action of the toothed quadrant in its connection with the toothed rack. The casing 17 serves to protect the toothed segment and the upwardly extending portion 7 serves to hold the toothed rack, prevent obstructions being placed in connection with teeth of the rack, and will protect the hands of the operator from injury.

I claim as my invention.

The combination with a pump head, of a standard extending from the head and having an upwardly extending tubular portion, opposite sides of the tubular portion being provided with longitudinal openings, a toothed rack movable in and having its upper end at all times housed by the tubular portion, said longitudinal openings being disposed out of line with the rack so that said rack is not exposed through said openings, said rack having a longitudinal opening therethrough, a pump rod slidable in the head and passing through the rack and tubular portion, a pin detachably passing transversely through the pump rod and toothed rack and located in rear of the teeth of said rack, said pin being exposed and removable through the openings of the tubular portion at any point in its travel and said openings permitting the free up and down movements of the pin, a toothed quadrant meshing with the toothed rack, and a handle connected to the toothed segment.

In testimony whereof I have hereunto set my hand in presence of two subscribing witnesses.

OSCAR W. JOHNSON.

Witnesses:
 A. O. BEHEL,
 E. D. E. N. BEHEL.